United States Patent
Romano

(10) Patent No.: US 10,209,982 B2
(45) Date of Patent: Feb. 19, 2019

(54) DISTRIBUTED STORAGE FRAMEWORK INFORMATION SERVER PLATFORM ARCHITECTURE

(71) Applicant: Bank of America Corporation, Charlotte, NC (US)

(72) Inventor: Brad Edmund Romano, Furlong, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 15/596,883

(22) Filed: May 16, 2017

(65) Prior Publication Data
US 2018/0336023 A1    Nov. 22, 2018

(51) Int. Cl.
*G06F 8/65* (2018.01)
*H04L 29/08* (2006.01)

(52) U.S. Cl.
CPC ............ *G06F 8/65* (2013.01); *H04L 67/1097* (2013.01); *H04L 67/34* (2013.01)

(58) Field of Classification Search
None
See application file for complete search history.

(56) References Cited

U.S. PATENT DOCUMENTS

| 6,151,688 | A | 11/2000 | Wipfel et al. | |
|---|---|---|---|---|
| 7,493,311 | B1 * | 2/2009 | Cutsinger | ......... G06F 17/30545 |
| 8,706,798 | B1 * | 4/2014 | Suchter | ................. G06F 9/5038 |
| | | | | 709/202 |
| 8,849,891 | B1 | 9/2014 | Suchter et al. | |
| 9,000,945 | B2 * | 4/2015 | Sobotka | ................. G01D 4/002 |
| | | | | 340/870.03 |

(Continued)

FOREIGN PATENT DOCUMENTS

| CN | 102130950 A | 7/2011 |
|---|---|---|
| EP | 3270289 A2 | 1/2018 |

OTHER PUBLICATIONS

Oracle, "Installing and Configuring the Microsoft IIS Plug-In", 2015, https://docs.oracle.com/cd/E13222_01/wls/docs91/plugins/isapi.html.*

*Primary Examiner* — Hossain M Morshed
(74) *Attorney, Agent, or Firm* — Michael A. Springs; Moore & Van Allen PLLC; James C. Edwards

(57) ABSTRACT

Embodiments of the invention are directed to a system, method, and computer program product for leveraging and improving distributed computing cluster architecture by installing a first version and a second version of an information server platform on separate pools of nodes within the same physical distributed computing cluster. The system generates unique file directory storage locations within the cluster allowing for the separate binaries associated with each of the versions to be accurately distinguished from one another by a resource manager tool. The two versions are able to coexist within the same physical storage location inside the distributed computing cluster. Concurrent version installations within the same cluster are advantageous for testing and verifying a newer version before ultimately uninstalling the older version in that a seamless transition between versions is achievable with uninterrupted service. Additionally, the storage structure allows for efficient sharing of data between domains within the cluster itself.

20 Claims, 4 Drawing Sheets

(56) References Cited

U.S. PATENT DOCUMENTS

| | | |
|---|---|---|
| 9,172,608 B2 | 10/2015 | Zeyliger et al. |
| 9,178,935 B2 | 11/2015 | Chiu et al. |
| 9,325,593 B2 | 4/2016 | Suchter et al. |
| 9,602,423 B2 | 3/2017 | Suchter et al. |
| 9,612,953 B1 | 4/2017 | Davis et al. |
| 9,647,955 B2 | 5/2017 | Suchter et al. |
| 2003/0140126 A1* | 7/2003 | Budhiraja ............ G06F 9/44536 709/220 |
| 2004/0243673 A1 | 12/2004 | Goyal et al. |
| 2006/0004886 A1* | 1/2006 | Green ............... G06F 17/30356 |
| 2008/0319555 A1* | 12/2008 | Meyer ..................... G06F 9/451 700/11 |
| 2010/0223385 A1* | 9/2010 | Gulley ................. G06F 9/5027 709/226 |
| 2010/0306286 A1 | 12/2010 | Chiu et al. |
| 2011/0228668 A1 | 9/2011 | Pillai et al. |
| 2012/0054182 A1 | 3/2012 | Gupta et al. |
| 2012/0110150 A1* | 5/2012 | Kosuru ................ H04L 41/082 709/221 |
| 2012/0151074 A1* | 6/2012 | Wood .................. H04L 63/0281 709/228 |
| 2013/0204948 A1 | 8/2013 | Zeyliger et al. |
| 2014/0040874 A1* | 2/2014 | Wilson ............... G06F 9/44526 717/170 |
| 2014/0096121 A1* | 4/2014 | Joshi ........................ G06F 8/65 717/170 |
| 2014/0195558 A1 | 7/2014 | Murthy et al. |
| 2015/0067002 A1 | 3/2015 | Shvachko et al. |
| 2015/0067004 A1 | 3/2015 | Shvachko et al. |
| 2016/0092204 A1* | 3/2016 | Katkere .................... G06F 8/71 717/170 |
| 2016/0283335 A1* | 9/2016 | Yao ...................... G06F 11/2023 |
| 2016/0342409 A1* | 11/2016 | Acker ....................... G06F 8/65 |
| 2017/0264564 A1 | 9/2017 | Suchter et al. |
| 2017/0302586 A1 | 10/2017 | Suchter et al. |
| 2017/0315796 A1* | 11/2017 | Melnik ..................... G06F 8/60 |
| 2017/0373940 A1* | 12/2017 | Shahab .................. H04L 41/12 |

\* cited by examiner

DISTRIBUTED STORAGE FRAMEWORK INFORMATION SERVER PLATFORM ARCHITECTURE

BACKGROUND

As various entities shift focus to processing and analysis of increasingly large data sets (i.e., big data) to reveal patterns, trends, and associations, traditional database structures and computing systems are not able to fulfill requested demands due to hardware limitations (i.e., insufficient processing capabilities, available memory, or available bandwidth). Efficient analysis and application of large data sets requires processing large volumes of varied, sometimes unstructured, data at high speeds. As such, an improved computational framework is necessary to sufficiently handle data under these conditions.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing a system, computer program product, and computer-implemented method for leveraging and improving a distributed computing cluster in order to optimize data storage and access while installing and/or updating an information server platform.

The invention may be exampled by a system which defines a specific embodiment of the invention. The system typically comprises a distributed computing cluster comprising one or more computing nodes in operative communication with one another and a resource manager tool running on the distributed computing cluster. The system further typically comprises a memory device comprising computer-readable program code, a communication device in communication with one or more other systems over a network, such as a wireless Internet network or the like. Further, the system typically comprises a processing device operatively coupled to the distributed computing cluster, the memory device, and the communication device, wherein the processing device is configured to execute the compute-readable program code. The system first installs install a first version of an information server platform on a first pool of computing nodes within the distributed computing cluster. The system then may receive a request to install a second version of the information server platform within the distributed computing cluster. In response to the request, the system separates binaries (i.e., installation files) of the first version and the second version of the information server platform. Finally, the system installs the second version of the information server platform on a second pool of computing nodes within the distributed computing cluster.

In some embodiments of the invention, the system may further retain the first version of the information server platform in the distributed computing cluster upon installing the second version of the information server platform.

In some embodiments of the invention, the system may operate the first version and the second version of the information server platform concurrently within the distributed computing cluster.

In some embodiments of the invention, the system may further uninstall the first version of the information server platform after installation of the second version of the information server platform.

In some embodiments of the invention, the system may migrate data from the first version of the information server platform to the second version of the information server platform.

In some embodiments of the invention, the system may further generate a first head node and a second head node within the distributed computing cluster. The system then installs the first version of the information server platform through a first head node and installs the second version of the information server platform through a second head node.

In some embodiments of the invention, the system may update the first version of the information server platform with the second version of the information server platform.

In some embodiments of the invention, the system may install the first version and the second version of the information server platform on separate pools of nodes physically collocated within the distributed computing cluster.

In some embodiments of the invention, the system may authorize the second version of the information server platform access to the same data as the first version of the information server platform.

In some embodiments of the invention, the system may establish a direct connection to a head node for direct installation of the information server platform.

In some embodiments of the invention, the system may simultaneously install the information server platform through a backup head node as well as a primary head node, wherein the backup head node resumes installation upon failure of the installation through the primary head node.

In some embodiments of the invention, the system may store one or more operational domains in the one or more computing nodes within the distributed computing cluster. The one or more operational domains may share data within the distributed computing cluster. Furthermore, the system may require permission for the data to be accessible by the one or more operation domains within the distributed computing cluster.

In some embodiments of the invention, the system may install the first version and the second version of the information server platform remotely on a virtual server.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
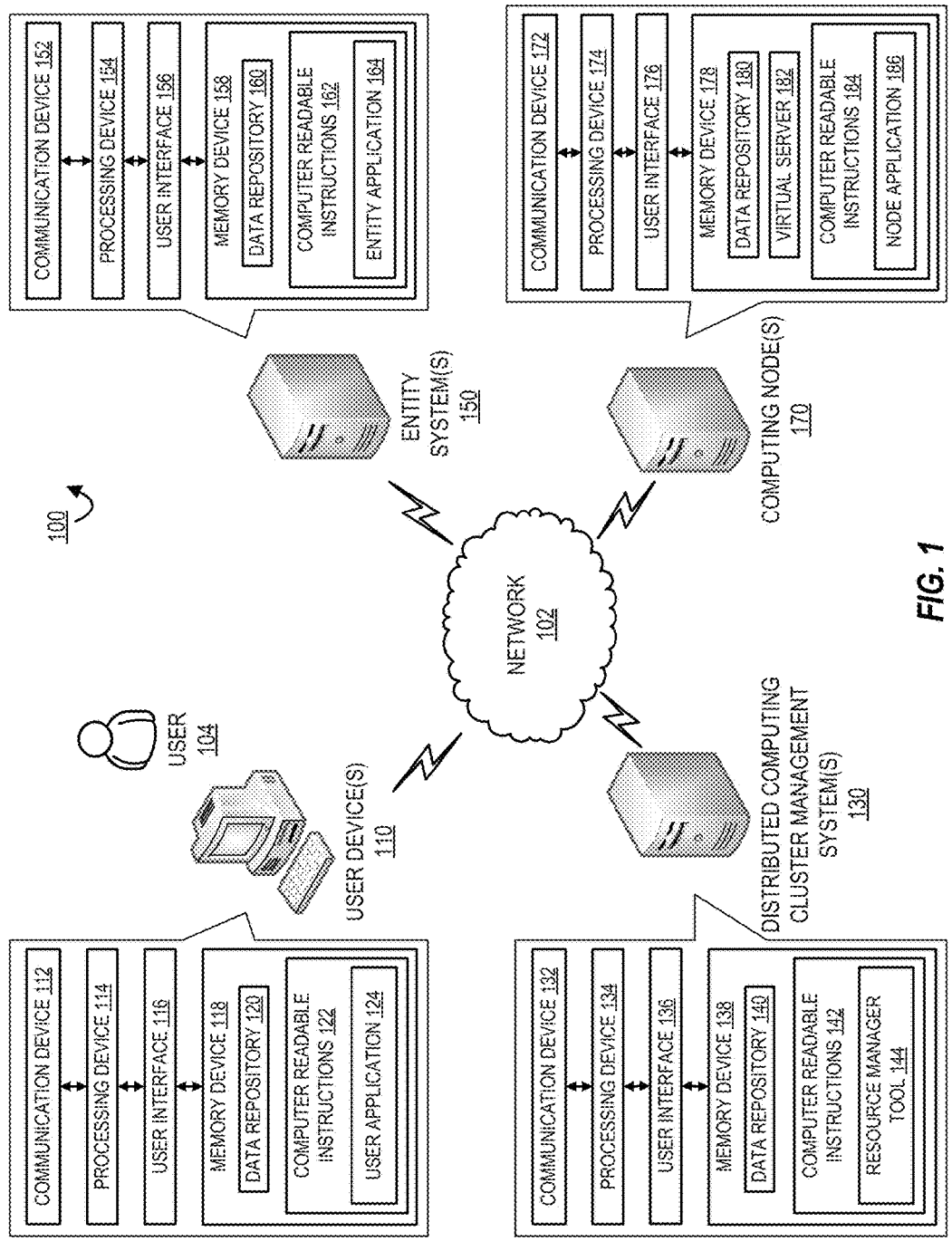
Figure 2:
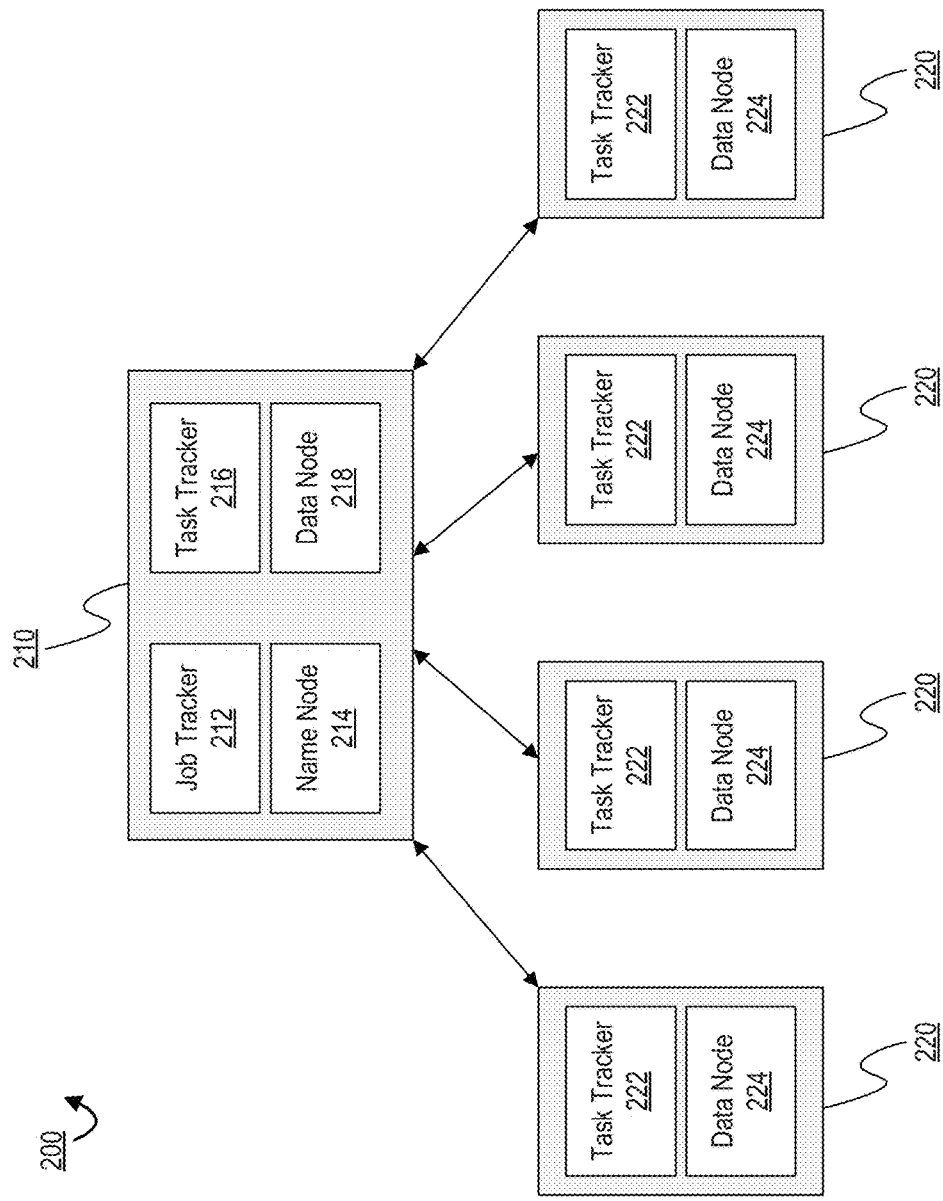
Figure 3:
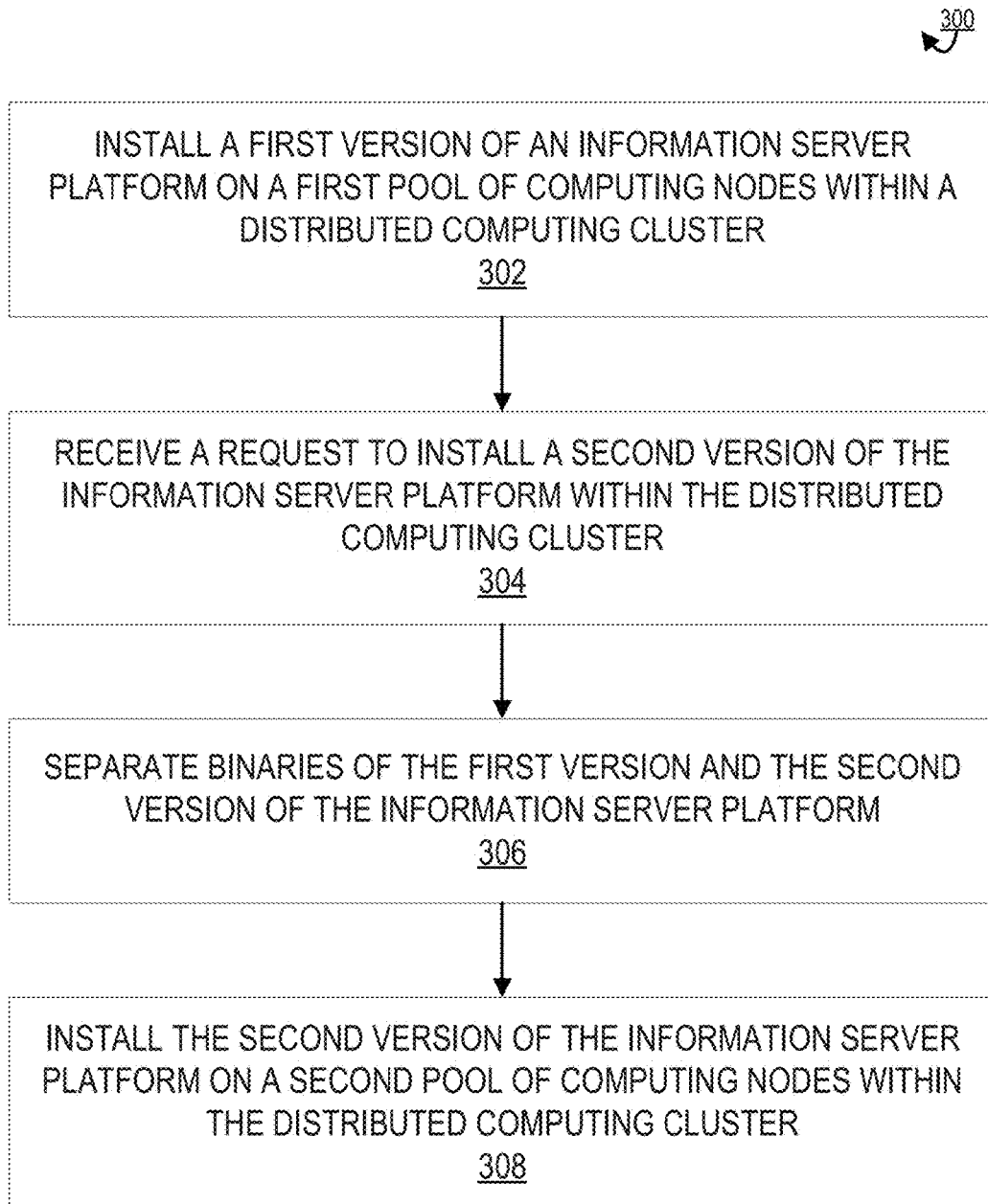
Figure 4:
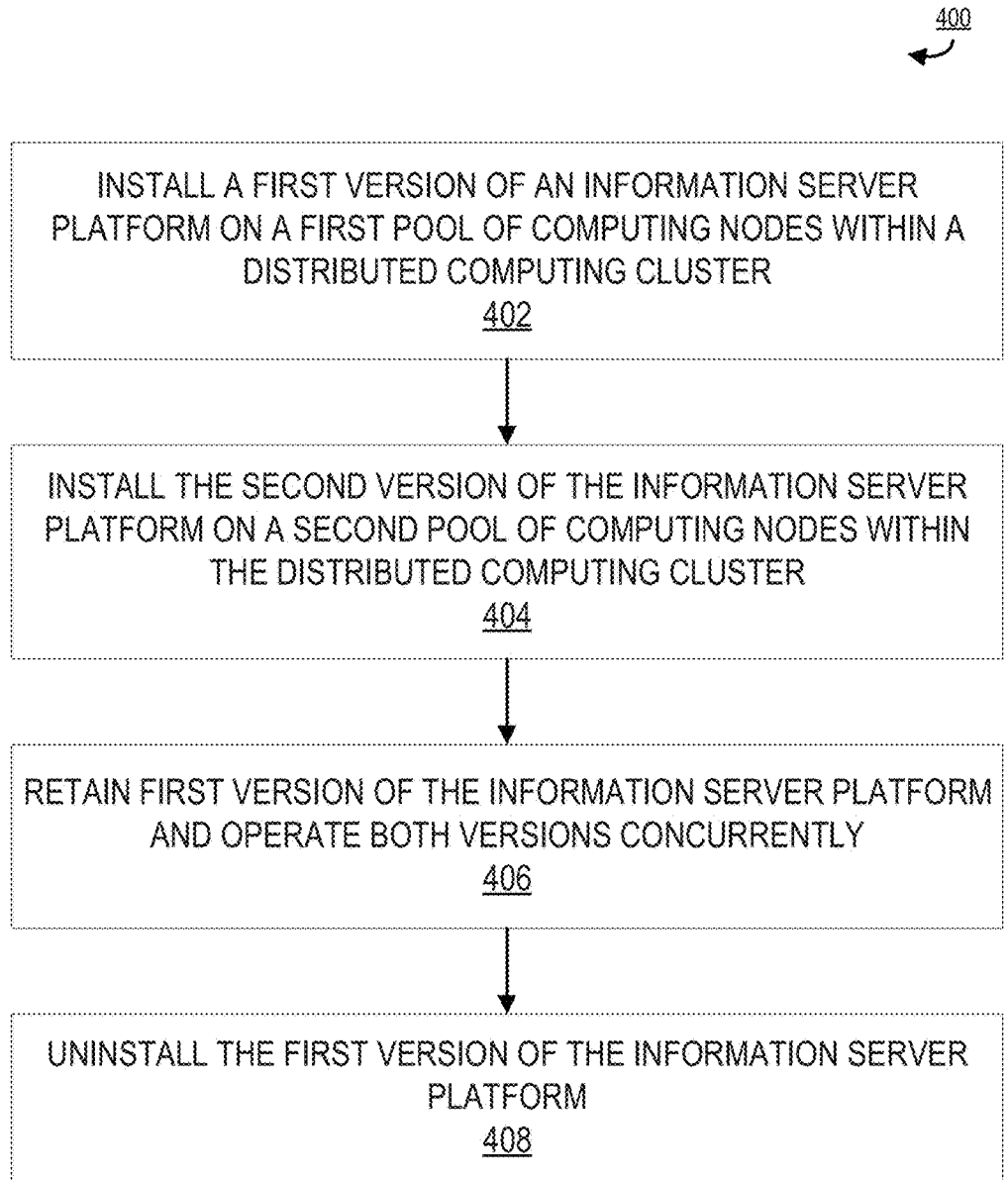

Having thus described embodiments of the invention in general terms, reference will now be made the accompanying drawings, wherein:

FIG. 1 provides a distributed storage framework information server platform system and environment, in accordance with an embodiment of the invention;

FIG. 2 provides an illustration of a portion of an example distributed computing cluster, in accordance with embodiments of the invention;

FIG. 3 provides a high-level process for . . . , in accordance with embodiments of the invention; and FIG. 4 provides a high-level process flow for uninstalling a first version of the information server platform, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

A "user" as used herein may refer to any entity or individual associated with the distributed storage framework information server platform system. In some embodiments, a user may be a mobile device application user, a financial institution customer (e.g., an account holder or a person who has an account (e.g., banking account, credit account, or the like)), a system operator, database manager, and/or employee of an entity. In some embodiments, identities of an individual may include online handles, usernames, aliases, family names, maiden names, nicknames, or the like. In some embodiments, the user may be a customer or supplier of an distributed storage platform, service, and/or system. In some embodiments, the user may be an individual or an organization (i.e., a charity, business, company, governing body, or the like).

Furthermore, as used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), personal digital assistant (PDA), a mobile Internet accessing device, or other mobile device. Other types of mobile devices may include portable digital assistants (PDAs), pagers, wearable devices, mobile televisions, gaming devices, laptop computers, cameras, video recorders, audio/video player, radio, global positioning system (GPS) devices, or any combination of the aforementioned. The user device may be used by the user to access the system directly or through an application, online portal, internet browser, virtual private network, or the like.

As used herein, the term "computing node" or "node" may be used to refer to a computing device that is a part of a distributed computing cluster of the distributed storage information server platform architecture system. A computing node may be a commodity computing device or a specialized computing device constructed specifically for use within the distributed computing cluster. A computing node may include a device similar to a user device as previously described or may be a server. The one or more computing nodes of a distributed computing cluster may be maintained in-house by an accessing entity or accessed remotely by a accessing entity from a maintaining entity. The one or more computing nodes of the distributed computing cluster may be physically collocated at the same or substantially the same location or may not be located at the same location.

As used herein, the term "resource" may be used to refer to elements of one or more computing devices, distributed computing clusters, networks, or the like available to be used in the execution of tasks or processes. A resource may include processor, memory, or network bandwidth and/or power used for the execution of tasks or processes. A resource may be used to refer to available processing, memory, and/or network bandwidth and/or power of an individual computing device as well a plurality of computing devices that may operate as a collective for the execution of one or more tasks (i.e., nodes of a distributed computing cluster).

In accordance with embodiments of the invention, the term "entity" may be used to include any organization that may interact with the distributed storage framework information server platform architecture system. An entity may refer to a business, company, or other organization that either maintains or operates the system or requests use and accesses the system. The terms "financial institution" and "financial entity" may be used to include any organization that processes financial transactions including, but not limited to, banks, credit unions, savings and loan associations, investment companies, stock brokerages, assess management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

"Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, a accessing of stored data by one or more nodes of a computing cluster, a transmission of a requested task, or the like.

Embodiments of the present invention provide a system, method, and computer program product for leveraging and improving distributed computing cluster architecture by installing a first version and a second version of an information server platform on separate pools of nodes within the same physical distributed computing cluster. The system generates unique file directory storage locations within the cluster allowing for the separate binaries associated with each of the versions to be accurately distinguished from one another by a resource manager tool. In this way, the two versions are able to coexist within the same physical storage location inside the distributed computing cluster. Advantages of concurrent version installations within the same cluster is advantageous for testing and verifying a newer version before ultimately uninstalling the older version in that a seamless transition between versions is achievable with uninterrupted service. Additionally, the storage structure allows for efficient sharing of data between domains within the cluster itself.

With increased reliance on the processing and analysis of large data sets (i.e., big data), conventional database systems cannot efficiently complete requested tasks within a reasonable timeframe and without requiring specialized computing resources and hardware. Traditional database structures have historically leaned toward a relational database format, wherein data is structured into a data model known as a schema which logically organizes data in tables along with the relationships that the tables have to one another. In relational databases, it is essential that the data be correctly structured and organized as inconsistencies or errors can lead to anomalies in reading and processing the data which may severely impact efficiency. As companies, businesses, and other entities focus on analyzing, processing, and executing applications using increasingly large data sets to reveal patterns, trends, and associations, traditional database structures and computing systems are not able to fulfill demands due to hardware limitations (i.e., insufficient processing capabilities, available memory, or available bandwidth). Analyzing and applying big data requires processing large volumes of varied, sometimes unstructured, data at high speeds. An improved computational environment is necessary to sufficiently handle data under these conditions.

Distributed computing cluster platforms (e.g., Hadoop) provide a framework for fast and efficient storage, analysis, and implementation of big data by breaking data into smaller pieces and spreading any computation out equally across nodes (i.e., computing devices) of the cluster. Distributed data and/or requested tasks are recombined and sent back to a requesting application or system as a combined, final result. Distributed processing across the nodes of the cluster allows for faster and more efficient processing of large amounts of data than traditional database systems. Also, unlike traditional database systems which typically require specialized computer systems to store and process large amounts of data, a distributed computing cluster may instead employ numerous, commodity (i.e., low-cost) computer hardware systems to perform tasks. Further, this distributed model is highly scalable as additional hardware can be added incrementally as required (i.e., as data grows) granting flexibility of the system and potential cost savings during system construction and maintenance.

The present invention leverages and improves distributed computing cluster architecture to address and solve the specific technological problems of how to install multiple versions of the same software (e.g., the information server platform as described herein) on separate nodes within the same physical distributed computing cluster. Additionally, while distributed computing clusters have traditionally only been used for analytical processing, the present invention adapts the resources of the cluster to a new area of operational processing (e.g., performing tasks, transaction processing, transforming data, and the like). The system generates unique file directory locations for storage of the binaries associated with each version to allow a resource manager tool to be able to accurately distinguish each version. This allows for concurrent operation of one or more versions on the same cluster which is advantageous for resource efficient testing and verification of the newer versions before updating and uninstalling the older version. Additionally, this storage architecture allows for more efficient data sharing within the cluster that would typically require additional computing resources to transmit data between separate locations over a network. The invention further allows for the nonconventional use of commodity computing hardware to construct a distributed computing cluster.

FIG. 1 provides a block diagram illustrating a distributed storage framework information server platform system and environment 100, in accordance with an embodiment of the invention. The environment 100 includes a user device 110 associated and/or used with authorization of a user 104, a distributed computing cluster management system 130, an entity system 150, and a computing node 170. It should be understood, that within the environment 100 there may be more than one of any of the components or systems described or that one or more of components or systems may be embodied as a single device.

As used herein, a "processing device," such as the processing devices 114, 134, 154, and 174, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" such as the user interfaces 116, 136, 156, and 176, generally includes a plurality of interface devices and/or software that allow a user to input commands and/or data to direct the processing device to execute instructions or tasks. For example, the user interfaces presented in FIG. 1 may include a graphical user interface (GUI) or an interface to input computer-executable instructions that direct the processing device to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more customers.

As used herein, a "memory device" such as memory devices 118, 138, 158, and 178 generally refers to a device or combination of devices that store one or more forms of computer-readable media for storing data and/or computer-executable program code/instructions. Computer-readable media is defined in greater detail below. For example, in one embodiment, the memory device includes any computer memory that provides an actual or virtual space to temporarily or permanently store data and/or commands provided to the processing device when it carries out its functions described herein.

As used herein, a "communication device" generally includes a modem, server, transceiver, and/or other device for communicating with other devices on a network, and/or a user interface for communicating with one or more customers. Referring again to FIG. 1, the communication devices 112, 132, 152, and 172 comprise communication interfaces having one or more devices configured to communicate with one or more other devices on a network, such as a mobile device, a personal computing device, a server, a distributed computing cluster, third party systems, and/or the like. The processing device is configured to use the network communication device to transmit and/or receive data and/or commands to and/or from the other devices connected to the network. Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

The systems and devices communicate with one another over the network 102 and perform one or more of the various steps and/or methods according to embodiments of the disclosure discussed herein. The network 102 may include a local area network (LAN), a wide area network (WAN), and/or a global area network (GAN). The network 102 may provide for wireline, wireless, or a combination of wireline and wireless communication between devices in the network. In one embodiment, the network 102 includes the Internet.

The user device 110 includes a communication device 112 communicably coupled with a processing device 114, which is also communicably coupled with a memory device 118. In some embodiments, the communication device 112 may also comprise a GPS transceiver capable of determining a geographic location associated with the user device 110. The processing device 114 is configured to control the communication device 112 such that the user device 110 communicates across the network 102 with one or more other systems. The processing device 114 is also configured to access the memory device 118 in order to read the computer readable instructions 122, which in some embodiments includes a user application 124. The user application 124 allows for communication of the user device 110 with the other systems and devices within the environment 100 such as the distributed computing cluster management system 130, entity system 150, and/or computing node 170. The user application 124 allows the user 104 to receive information transmitted as well as input information requested by the other systems and communicate with and request the execution of tasks from a distributed computing cluster, one or more third parties, and/or other entities. In some embodiments, the user application 124 further allows the user to interact with manipulate the user application 124 via the user device 110 and the user interface 116. The memory device 118 also includes a data repository 120 or database for storing pieces of data that can be accessed by the processing device 114.

The distributed computing cluster management system 130 includes a communication device 132 communicably coupled with a processing device 134, which is also communicably coupled with a memory device 138. The processing device 134 is configured to control the communication device 122 such that the distributed computing cluster management system 130 communicates across the network 102 with one or more other systems. The processing device 134 is also configured to access the memory device 138 in order to read the computer readable instructions 142, which in some embodiments includes a resource manager tool 144. The resource manager tool 144 allows for communication with the other systems and devices within the environment 100 such as the user device 110, the entity system 150, and the computing node 170. The memory device 138 also includes a data repository 140 or database for storing pieces of data that can be accessed by the processing device 134. In some embodiments, the data repository 140 further comprises a suite of additional applications or built in functions for use by the distributed computing cluster management system. In some embodiments, the distributed computing cluster management system 130 may be part of the user device 110, entity system 150, or computing node 170.

The entity system 150 includes a processing device 154 operatively coupled to a network communication device 152 and a memory device 158. The processing device 154 is configured to control the communication device 152 such that the entity system 150 communicates across the network 102 with one or more other systems. The processing device 154 is also configured to access the memory device 158 in order to read the computer readable instructions 162, which in some embodiments includes an entity application 164. The entity application 164 allows for communication with the other systems and devices within the environment 100 such as the user device 110, the distributed computing cluster management system 130, and the computing node 170. The memory device 158 also includes a data repository 160 or database for storing pieces of data that can be accessed by the processing device 154.

The computing node 170 includes a processing device 174 operatively coupled to a network communication device 172 and a memory device 178. The computing node 170 includes a communication device 172 communicably coupled with a processing device 174, which is also communicably coupled with a memory device 178. The processing device 174 is configured to control the communication device 172 such that the computing node 170 communicates across the network 102 with one or more other systems. The processing device 174 is also configured to access the memory device 178 in order to read the computer readable instructions 184, which in some embodiments includes a node application 186. The node application 186 allows for communication with the other systems and devices within the environment 100 such as the user device 110, the distributed computing cluster management system 130, and the entity system 150. The memory device 178 also includes a data repository 180 or database for storing pieces of data that can be accessed by the processing device 174. In some embodiments, the computing node 170 may further comprise at least a portion of a virtual server 182 installed on the computing node 170, wherein the virtual server 182 may be accessed directly or remotely by one of the other system within the environment. In other embodiments, the virtual server 182 may be stored within one or more of the other systems within the environment 100. In yet other embodiments, there is no virtual server 182. In some embodiments of the invention, the computing node 170 is a plurality of computing nodes within a distributed computing cluster.

The user application 124, the resource manager tool 144, the entity application 164, and the node application 186 are for instructing the processing devices on their respective systems to perform various steps of the methods discussed herein, and/or other steps and/or similar steps. In various embodiments, one or more of the various applications discussed are included in the computer readable instructions stored in a memory device of one or more systems or devices other than their respective systems and/or devices. For example, in some embodiments, the resource manager tool 144 is stored and configured for being accessed by a processing device of the computing node 170 connected to the network 102. In various embodiments, the user application 124, the resource manager tool 144, the entity application 164, and the node application 186 are stored and executed by different systems/devices. In some embodiments, the discussed applications may be similar and may be configured to communicate with one another. In some embodiments, the various applications may be considered to be working together as a singular application despite being stored and executed on different systems.

In various embodiments, one or more of the systems discussed above, such as the computing node 170, may be embodied as more than one system and the various components of the system are not collocated, and in various embodiments, there are multiple components performing the functions indicated herein as a single device. For example, in one embodiment, multiple processing devices perform the functions of the processing device 134 of the distributed computing cluster management system 130 described herein. Furthermore, one or more of the various device and/or systems described herein may be embodied as one or more combined devices and/or systems.

In various embodiments, the user device 110, the distributed computing cluster management system 130, the entity system 150, the computing node 170 and/or other systems may perform all or part of a one or more method or process steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

FIG. 2 provides an illustration of a portion of an example distributed computing cluster 200. The cluster includes a plurality of nodes (i.e., computing devices) in which data may be at least partially stored and across which processes or tasks may be executed upon. The nodes of the computing cluster 200 typically have a master-slave relationship, wherein a master node 210 assigns tasks to a plurality of slave nodes 220 by coordinating and distributing tasks to the slave nodes 220 while maintaining a log of the task as a whole. The master node 210 comprises a job tracker 212 which breaks tasks down into smaller pieces and distributes the pieces of the tasks to one or more task trackers 222 of the slave nodes 220. Upon completion of the task, the task trackers 222 send the completed task back to the job tracker 212 and the task is recombined and sent back to the requesting system or application. The master node 210 further comprises a name node 214 which is responsible for maintaining an index of the data contained on each data node of the cluster. The name node 214 may report to a requesting system or application the location of stored data residing within the cluster, wherein the requesting system or application may then proceed to retrieve the data directly from the located data node. Each of the plurality of slave nodes 220 comprise a task tracker 222 which processes the task assigned to the node and a data node 224 which manages the data assigned to the node. The master node 210 may simultaneously perform the functions of a slave node and process a portion of a task while managing the process as a whole. Unlike a traditional database system, unstructured data may be brought to the location of the processing power of the nodes within the cluster for distributed processing across the nodes. Within the distributed computing cluster, data doesn't have to be stored in a conventional schema, but instead, the system determines and generates a schema as the data is being read. Because of this, data may be structured, semi-structured, or unstructured within the distributed computing cluster without experiencing the same anomalies and errors of a conventional structured database system (i.e., relational database).

Within the distributed computing cluster, the job tracker 212 and the task tracker 222 are typically maintained or managed by a high-level component (e.g., MapReduce in Hadoop) while the name node 214 and data nodes are maintained by a distributed computing cluster file system (e.g., Hadoop file system (HDFS)). The distributed computing cluster may be further maintained by a cluster management technology (e.g., Hadoop Yet Another Resource Manager (YARN)). The system may further incorporate a suite of additional applications for various tasks as well.

FIG. 3 provides a high-level process flow for installing and managing an information server platform with a distributed computing cluster framework, in accordance with embodiments of the invention. Referring now to block 302 of FIG. 3, the system first installs a first version of an information server platform on a first pool of computing nodes within a distributed computing cluster. The information server platform may be a data integration platform (e.g., IBM InfoSphere® Information Server or the like) for fast and efficient analysis and processing of large amounts of data (i.e., big data). In some embodiments, the information server platform may be deployed across a distributed computing cluster (e.g., Hadoop) such as the distributed computing cluster as described herein. The information server platform may further comprise a suite of products, capabilities, or applications for additional data processing, transformation, integration, quality control, and/or analysis.

Installation of the information server platform may be initiated from by a user requesting use of the processing resources of the computing nodes that form the distributed computing cluster. In other embodiments, the installation may be triggered by an entity maintaining the distributing computing cluster or a third party that provides the information server platform and distributed computing capabilities as a service to customers. In yet other embodiments, the installation may be automatically triggered, such as in response to a request for use of the functionalities of the information server platform and/or the distributed computing cluster, wherein the system must install or update software within the system to be able to fulfill the request. In other embodiments, the information server platform may be preinstalled on the hardware of the system.

The information server platform may be installed on one or more of the computing nodes within the distributed computing cluster. In some embodiments, the installation of the platform may be distributed across one of more of the computing nodes of the distributed cluster. In some embodiments, the platform is layered across the entire cluster to manage operations and resources (i.e., via the resource manager tool). The information server platform may be directly installed on a head node (i.e., a master node) in order to control and manage the distribution and location of data within the cluster and act as a launching point for jobs or tasks being executed by the cluster. In other embodiments, the platform may be installed on an edge node of the cluster, an edge node being a trusted system which acts as an interface between the distributed computing cluster and an external system or network. In this way, the edge node may function as a staging area for the data being transferred (i.e., the installation) into the distributed computing cluster to ensure that there is minimal competition for resources at master and slave nodes within the cluster itself for critical processes of the cluster.

Alternatively, by non-conventionally installing the platform (or any other application or data) directly to a node within the cluster, the process of installing the platform may be expedited by removing the intermediate step. However, proper allocation and distribution of resources and resource bandwidth must be considered in this process. The resource manager tool may prevent one application or task from using an excessive amount of computing resource bandwidth. Additionally, by installing to an edge node, updates may automatically installed to the components of the platform and distributed computing cluster; however, by installing on a head node directly, updates must be installed manually.

In some embodiments, the system may be configured to only install the platform or other application only on one or more specific computing nodes of the distributed computing cluster. In other embodiments, the system may automatically select which nodes to use for installation. In some embodiments, the selection of the nodes used for installation may be based on the storage location of data to be used by the nodes.

In some embodiments, the information server platform may be installed and stored directly on the server hardware of the distributed computing cluster. In other embodiments, the information server platform may be installed on a virtual server or virtual machine on the distributed computing cluster. In some embodiments, the system builds and installs the virtual server or virtual machine, installs the virtual server/machine on the distributed computing cluster (or other system within the environment 100), and uploads or transmits the data for the installation of the platform to the virtual server/machine of the cluster. In this way, the distributed computing cluster and/or supporting server system may host the information server platform within the virtual server/machine which may emulate a particular architecture or environment required by the platform (or other installed software or data). The virtual server may be maintained by an entity or third party so that the user only has to maintain and update the user's software and not the hardware itself. However, the user retains full control of the software installed on the virtual server/machine. In some embodiments, installation data may be transmitted over a network and received by the distributed computing cluster or another system, such as the systems described in FIG. 1.

At block 304 of FIG. 3, the system receives a request to install a second version of the information server platform within the distributed computing cluster. In some embodiments, the second version of the information server platform may be an update or new version (e.g., update from v1.1 to v1.2) to the first version of the information server platform. An update to a version of the information server platform or other software may comprise improvements to the software, bug fixes, added features or functionalities, repairs, or the like. In some embodiments, the second version of the information server may be the same as the first version of the platform.

The request for installation of the second version of the information server platform may comprise a requested or required update issued by a user, system manager, software managing platform, (e.g., an app store) or the like. In some embodiments, the request for the installation of the second version may be a routine or scheduled update, wherein the request is automatically transmitted to the system without explicit input from a user, system manager, or the like. In other embodiments, the system requires permission from a user in order to install the second version of the information server platform or other software on the distributed computing cluster.

The request to install the second version of the information server platform may be in the form of a control signal transmitted to or within the system (e.g., from a user device to the distributed computing cluster management system or computing node). The control signal may command the system to install the second version of the information server platform and/or other software of applications. The request to install the second version of the platform or some other software may further comprise the transmission of additional data or packets which may comprise files or binaries for the installation of the new software. A transmission of additional data for installation of new software may transmitted electronically over a network and/or, in other embodiments, input at the physical location of the system (e.g., an installation disk or storage drive attachment).

At block 306 of FIG. 3, the system separates binaries of the first version and the second version of the information server platform. Binaries are compiled files (e.g. .exe, .dll, or the like) used in the installation of a program and typically comprise several compiled text files (e.g., .c, .cpp, .h, in C/C++) which contain the source code for the software. In some embodiments, binaries may be unaccompanied and otherwise unaltered or may be in the form of a zip file or a setup that will properly install said binaries. In some embodiments, separating the binaries may comprise adding, deleting, or otherwise modifying one or more environment variables of the information platform or other application to allow for the one or more versions of the platform to be recognized and run within the same distributed computing cluster.

The system separates binaries for the first and second versions of the information server platform (or other software to be installed) by generating unique directories within the distributed computing cluster file system to allow for the resource manager tool (e.g., YARN) to distinguish and identify the first binaries and installation files associated with the first version of the information server platform and second binaries and installation files associated with the second version of the information server platform. The system alters the file directories of the system to create unique locations for installation files and data to be stored within the cluster and properly identified and accessed by the resource manager tool. Typically, the second version of the information server platform would have to be installed on a second distributed computing cluster as the resource manager tool would not be able to distinguish the two versions of the same software and would not allow for the installation. However, this technical problem is overcome through the manipulation of the file location directories to allow for unique and recognizable file storage locations. Binaries may be installed and distributed across the computing nodes of the distributed computing cluster. In some embodiments, when a version of the platform or other application is run for the first time, the system may copy the binaries to each of the nodes that will be running that version. In other embodiments, the binaries may not be copied over to each node as the computing resources of the distributed computing cluster may be limited or a user may indicate through an inputted command for the binaries to not be copied to each of the nodes.

At block 308 of FIG. 3, the system installs the second version of the information server platform on a second pool of computing nodes within the distributed computing cluster. In this way, both the first and second versions of the information server platform are installed on the same distributed computing cluster, wherein the first version is installed on a first pool of computing nodes and the second version is installed on a second pool of computing nodes. In some embodiments of the invention, the system generates a first head node on which to install the first version of the platform and a second head node on which to install the second version of the platform. In some embodiments, the system may simultaneously install a version of information server platform on both a primary head node and a backup head node. This simultaneous installation may operate as a failsafe mechanism, wherein the backup head node resumes the installation upon detection that the primary head node has failed or an error has been detected in the installation via the primary head node. In some embodiments, the content of the installations on the primary head node and the backup head node are identical.

In some embodiments, the system allows for the second version of the information server platform to access the same data as the first version of the information server platform. As the first and second versions are installed on different pools of nodes within the same distributed computing cluster, data may be shared between versions as long as permissions exist or are created. There is no need to transfer data over a network which may require added security to encrypt or protect potentially private information. In this way, a transition from the first version to the second version of the information server platform may be performed efficiently and seamlessly.

In some embodiments, the one or more computing nodes of the distributed computing cluster may further store data associated with one or more operational domains (e.g., divisions of a single business) within the same distributed computing cluster. This proves advantageous over other high performance computing systems (e.g., a grid) in that data can be shared between domains within the cluster without the need to transmit data over a network which may be more time and resource consuming as well as potentially requiring added security or encryption to protect private information. In some embodiments, data sharing within the distributed computing cluster may require the creation or existence of permissions between domains. A user or program may require authentication information, permission, or authorization to access data in one or more of the operational domains within the cluster.

FIG. 4 provides a high-level process flow for uninstalling of a first version of the information server platform based on installation of a second version of the information server platform, in accordance with embodiments of the invention. At blocks 402 and 404 respectively, the system initially installs a first version of an information server platform on a first pool of computing nodes and then installs a second version of the information server platform on a second pool of computing nodes within a distributed computing cluster similar the steps recited in FIG. 3.

At block 406 of FIG. 4, the system may retain the first version of the information server platform. In some embodiments of the invention, the system operates both the first and the second versions of the information server platform concurrently. In this way, the system may test and verify the newer, second version of the platform before fully implementing the second version while upgrading and replacing the first version. Furthermore, in some embodiments, the system allows users of the older version or programs that rely on the older version to continue to use the older version without requiring the user or the program to update or upgrade software to become compatible before resuming normal operation.

In some embodiments, the system may prevent one or more versions of concurrently running software (e.g., a first and/or second version of the information server platform) from consuming excess computing resources. In some embodiments, a resource manager tool may control or allocate computing resources dedicated to distributed tasks. In other embodiments, the system may reallocate computing resources of the distributed computing cluster based on demand or to fulfill service-level agreements (SLAs) which may require minimum levels of service quality or availability. In some embodiments, the system may allocate, distribute, or otherwise control computing resources among one or more computing lanes of one or more applications within the same distributed computing cluster. Tested updates may be chained together or batched and pushed out to one or more domains within the cluster which may share access to data stored within the cluster.

At block 408 of FIG. 4, the system uninstalls the first version of the information server platform leaving the second version as the remaining operational version of the information server platform and essentially upgrading or updating the platform to the newer version. As both versions are installed within the same distributed computing cluster with access to the same data and operating concurrently, there is no downtime experienced in the operation of the information server platform. This allows for a seamless transition between versions during an update which provides an uninterrupted experience for users of the system and distributed computing cluster.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein.

Moreover, it should be understood that the process flows described herein include transforming the information sent and/or received from the applications of the different systems (e.g., internally or externally) and/or the devices from one or more data formats into a data format associated with the application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for distributed storage framework information server architecture, the system comprising:
    a distributed computing cluster comprising one or more computing nodes in operative communication with one another and a resource manager tool running on the distributed computing cluster;
    a memory device comprising computer-readable program code;
    a communication device; and
    a processing device operatively coupled to the distributed computing cluster, the memory device, and the communication device, wherein the processing device is configured to execute the computer-readable program code to:
    install a first version of an information server platform on a first pool of computing nodes within the distributed computing cluster;
    alter a file directory associated with the distributed computing cluster to generate a first unique file directory storage location within the distributed computing cluster based on at least installing the first version of the information server platform;
    receive a request to install a second version of the information server platform within the distributed computing cluster;
    alter the file directory associated with the distributed computing cluster to generate a second unique file directory storage location within the distributed computing cluster based on at least receiving the request to install the second version of the information server platform;
    separate binaries of the first version and the second version of the information server platform based on at least altering the file directory associated with the distributed computing cluster and generating the first unique file directory storage location and the second unique file directory storage location; and
    install the second version of the information server platform on a second pool of computing nodes within the distributed computing cluster, wherein installing further comprises simultaneously installing the information server platform through a backup head node as well as a primary head node;
    determine an error in the installation of the second version of the information server platform through the primary head node; and
    initiate the installation of the second version of the information server platform through the backup head node based on at least determining the error, wherein initiating further comprises resuming the installation of the second version of the information server platform.

2. The system of claim 1 wherein the processing device is further configured to execute the computer-readable program code to retain the first version of the information server platform in the distributed computing cluster upon installing the second version of the information server platform.

3. The system of claim 2 wherein the processing device is further configured to execute the computer-readable program code to operate the first version and the second version of the information server platform concurrently within the distributed computing cluster.

4. The system of claim 1 wherein the processing device is further configured to execute the computer-readable program code to uninstall the first version of the information server platform after installation of the second version of the information server platform.

5. The system of claim 1 wherein the processing device is further configured to execute the computer-readable program code to migrate data from the first version of the information server platform to the second version of the information server platform.

6. The system of claim 1 wherein the processing device is further configured to execute the computer-readable program code to:
    generate a first head node and a second head node within the distributed computing cluster;
    install the first version of the information server platform through a first head node; and
    install the second version of the information server platform through a second head node.

7. The system of claim 1 wherein the processing device is further configured to execute the computer-readable program code to update the first version of the information server platform with the second version of the information server platform.

8. The system of claim 1 wherein the processing device is further configured to execute the computer-readable program code to install the first version and the second version of the information server platform on separate pools of nodes physically collocated within the distributed computing cluster.

9. The system of claim 1 wherein the processing device is further configured to execute the computer-readable program code to authorize the second version of the information server platform access to the same data as the first version of the information server platform.

10. The system of claim 1 wherein the processing device is further configured to execute the computer-readable program code to establish a direct connection to a head node for direct installation of the information server platform.

11. The system of claim 1 wherein the processing device is further configured to execute the computer-readable program code to store one or more operational domains in the one or computing nodes within the distributed computing cluster.

12. The system of claim 11, wherein the one or more operational domains share data within the distributed computing cluster.

13. The system of claim 12, wherein permission is required for the data to be accessible by the one or more operation domains within the distributed computing cluster.

14. The system of claim 1 wherein the processing device is further configured to execute the computer-readable program code to install the first version and the second version of the information server platform remotely on a virtual server.

15. A computer program product for distributed storage framework information server architecture, the computer program product comprising at least one non-transitory computer-readable medium having computer-readable program code portions embodied therein, the computer-readable program code portions comprising:
    an executable portion configured for installing a first version of an information server platform on a first pool of computing nodes within the distributed computing cluster;
    an executable portion configured for altering a file directory associated with the distributed computing cluster to generate a first unique file directory storage location within the distributed computing cluster based on at least installing the first version of the information server platform;
    an executable portion configured for receiving a request to install a second version of the information server platform within the distributed computing cluster;
    an executable portion configured for altering the file directory associated with the distributed computing cluster to generate a second unique file directory storage location within the distributed computing cluster based on at least receiving the request to install the second version of the information server platform;
    an executable portion configured for separating binaries of the first version and the second version of the information server platform based on at least altering the file directory associated with the distributed computing cluster and generating the first unique file directory storage location and the second unique file directory storage location; and
    an executable portion configured for installing the second version of the information server platform on a second pool of computing nodes within the distributed computing cluster, wherein installing further comprises simultaneously installing the information server platform through a backup head node as well as a primary head node;
    an executable portion configured for determining an error in the installation of the second version of the information server platform through the primary head node; and
    an executable portion configured for initiating the installation of the second version of the information server platform through the backup head node based on at least determining the error, wherein initiating further comprises resuming the installation of the second version of the information server platform.

16. The computer program product of claim 15 further comprising an executable portion configured for retaining the first version of the information server platform in the distributed computing cluster upon installing the second version of the information server platform.

17. The computer program product of claim 15 further comprising an executable portion configured for operating the first version and the second version of the information server platform concurrently within the distributed computing cluster.

18. The computer program product of claim 15 further comprising an executable portion configured for uninstalling the first version of the information server platform after installation of the second version of the information server platform.

19. A computer-implemented method for distributed storage framework information server architecture, the method comprising:
    installing a first version of an information server platform on a first pool of computing nodes within the distributed computing cluster;
    altering a file directory associated with the distributed computing cluster to generate a first unique file directory storage location within the distributed computing cluster based on at least installing the first version of the information server platform;
    receiving a request to install a second version of the information server platform within the distributed computing cluster;
    altering the file directory associated with the distributed computing cluster to generate a second unique file directory storage location within the distributed computing cluster based on at least receiving the request to install the second version of the information server platform;
    separating binaries of the first version and the second version of the information server platform based on at least altering the file directory associated with the distributed computing cluster and generating the first unique file directory storage location and the second unique file directory storage location; and
    installing the second version of the information server platform on a second pool of computing nodes within the distributed computing cluster, wherein installing further comprises simultaneously installing the information server platform through a backup head node as well as a primary head node;
    determining an error in the installation of the second version of the information server platform through the primary head node; and
    initiating the installation of the second version of the information server platform through the backup head node based on at least determining the error, wherein initiating further comprises resuming the installation of the second version of the information server platform.

20. The computer-implemented method of claim 19, wherein the method further comprises retaining the first version of the information server platform in the distributed computing cluster upon installing the second version of the information server platform.

* * * * *